Sept. 6, 1938. V. H. SEARS 2,129,040
ARTIFICIAL TEETH
Filed Jan. 5, 1934
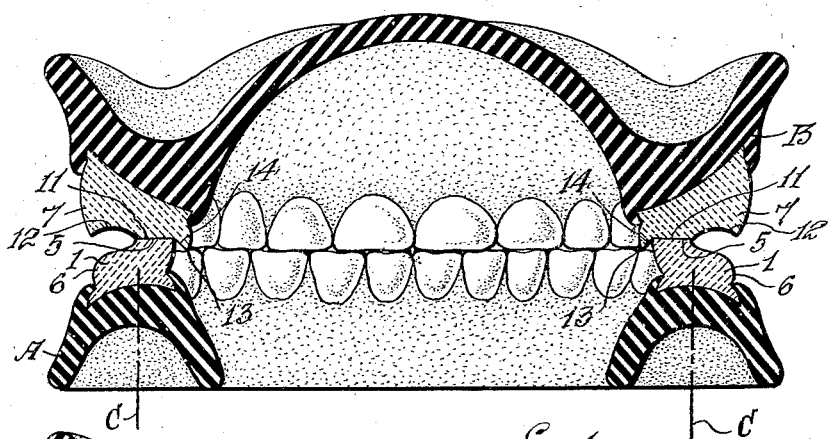
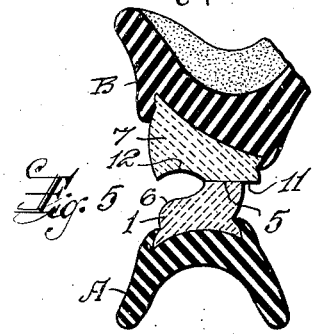
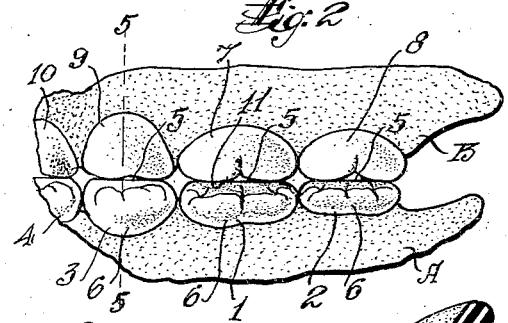
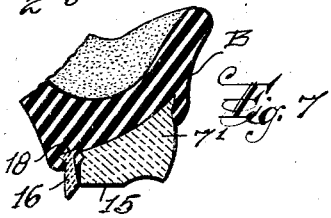
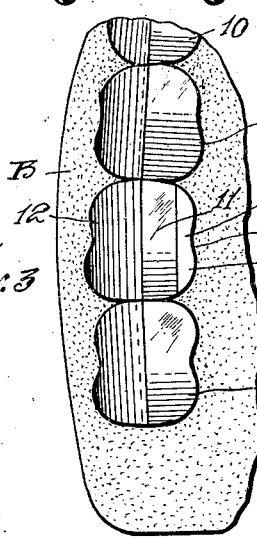
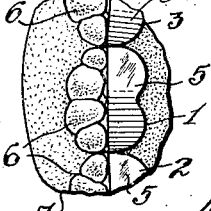
INVENTOR
Victor H. Sears,
BY Harry B. Cook
ATTORNEY Patented Sept. 6, 1938

2,129,040

UNITED STATES PATENT OFFICE 2,129,040

ARTIFICIAL TEETH

Victor H. Sears, New York, N. Y., assignor to Universal Dental Company, Philadelphia, Pa., a corporation of Pennsylvania Application January 5, 1934, Serial No. 705,352

8 Claims. (Cl. 32—2)

This invention relates in general to artificial teeth and more particularly to dentures including sets of artificial teeth, especially dentures having so called "non-anatomic" posterior teeth for both the upper and the lower jaws of the general character described in my Patent No. 1,681,436.

Artificial teeth are known not to function efficiently in dentures, particularly dental plates, because of the instability of the artificial teeth in the mouth which makes it practically impossible for the occlusal surfaces of the teeth to cooperate in a grinding operation like that possible with natural teeth. Furthermore, great uneasiness is encountered by most wearers of dental plates in frequent slipping or rubbing on the ridges or gums or displacement of the plates when the teeth are brought together which causes soreness in the mouth as well as annoyance and difficulty in chewing food, etc.

Most artificial teeth are made in close simulation of natural teeth, and I have found that the troubles above mentioned are largely due to the formation or shape of such artificial teeth made in simulation of natural teeth, particularly the last four back teeth on each side of each jaw, that is, the four molars and the four bicuspids on each jaw. The cusps and the occlusal surfaces of such teeth on the lower jaw interlock with the cusps of the teeth on the upper jaw and prevent relative movement of the plates both sidewise and forwardly and backwardly in the mouth. The consequence is that when pressure is exerted by the jaws either laterally or forwardly and backwardly, the upper or the lower or both of the plates slide relatively to the respective jaws or tilt due to the necessarily unstable mounting of the plates on the gums or ridges.

As is known to those skilled in the art, the anatomic or natural posterior upper teeth of each side of the jaw have buccal cusps which function or cooperate with cusps on the corresponding lower teeth when the lower jaw is moved during chewing upon one side, and also have lingual cusps which should remain in light contact with the cusps on the corresponding teeth when the lower jaw is moved to the other side with the teeth in contact. Contact of the teeth simultaneously on the right and left side is known as "bi-lateral" balance and such balance in artificial teeth is especially essential to efficiency and ease in mastication and to avoid displacement or movement of the dentures during chewing operations.

Furthermore, it is highly desirable that dentures be so constructed that the forces incident to mastication or closing of the jaws shall be balanced on opposite sides of the jaws so as to prevent tilting or movement of the dentures sidewise.

Therefore, one object of my invention is to provide upper and lower dentures having complemental teeth of novel form so that the forces incident to all functional or occlusal contact, i. e. mastication and closing of the jaws, shall be applied to the dentures simultaneously on the lingual sides of the crest of the gum or ridge whereby there shall be no tendency to tilting of the dentures.

Another object is to provide such dentures including complemental upper and lower teeth of such novel and improved form that "bi-lateral" balance shall be maintained during chewing operations and upon closing of the jaws.

A further object is to provide upper and lower dentures of the character described embodying teeth of novel and improved form each including a pseudo-occlusal surface, that is, a surface that appears normal but is non-functional in chewing operation, in combination with an occlusal surface in a single plane approximately parallel to the plane of the dental arches and located on the lingual side of the crest or apex of the gum or ridge, whereby all chewing shall be accomplished between the latter surfaces, to prevent interlocking of the complemental teeth and thereby ensure against movement of the dentures on the ridges or gums, and also to direct the occlusal force to the lingual side of the supporting ridge in order to assure favorable leverage instead of unfavorable leverage as where occlusal force is directed to the buccal side of the ridge.

A still further object is to provide dentures of this character including novel and improved complemental posterior teeth one of which has a balancing lingual cusp or protection which is either integral with the tooth and can be reduced by grinding or is separate from and adjustable in the denture independently of the main body of the tooth, to easily and quickly provide accurate "bi-lateral" balance and to properly relatively locate and fix the upper and lower dentures when they are off the articulator. Heretofore, such bilateral balance has been obtained by tilting the whole tooth which changes the location of both the "working" cusp and the "balancing" cusp, so that accurate balance has been difficult if not impossible to obtain.

Other objects are to provide such dentures whereby such "bi-lateral" balance can be obtained with only two complemental teeth on each side of the jaws, so that the other teeth can be artistically or more naturally located without affecting the balance; to provide dentures of the character described including novel and improved non-anatomic teeth whereby such teeth can be utilized where chewing or balancing function is required and anatomic teeth can be used in conjunction with such non-anatomic teeth where artistic or natural appearance is more important than function; to provide complemental lower and upper teeth which shall have cooperating flat surfaces on the lingual portions of their occlusal crowns, upon which all chewing shall be accomplished; to provide such an upper tooth which shall have an integral lingual balancing cusp to cooperate with the complemental lower tooth; to provide an upper tooth which shall include a main or body section and a separate liqual cusp section which can be adjusted in a denture relative to the main section; and to obtain other advantages and results as will be brought out by the following description.

Referring to the accompanying drawing in which corresponding and like parts are designated throughout the several views by the same reference characters, Figure 1 is a transverse vertical sectional view on a greatly enlarged scale through upper and lower dentures embodying my invention.

Figure 2 is a fragmentary side elevation of one side of the complemental upper and lower dentures.

Figure 3 is a fragmentary bottom plan view of the rear end of one side of the upper denture.

Figure 4 is a fragmentary plan view of one side of the lower denture.

Figure 5 is a transverse sectional view on the line 5—5 of Figure 2.

Figure 6 is a similar view through the other side of the dentures showing the operation of the balancing cusp.

Figure 7 is a fragmentary transverse vertical sectional view through one side of the upper denture showing a modified form of balancing cusp, and Figure 8 is a sectional view through an upper molar tooth showing the manner of adjusting the balancing cusp.

While I have shown complete upper and lower sets of teeth, my invention is particularly directed toward improvement of the rear end of the dentures and the bicuspid and molar teeth for the upper and lower jaws. The molars and bicuspids have been shown as separate teeth, but it should be understood that the invention may also be embodied in block form of teeth, that is where the posterior and anterior molars, or the pre-molars or bicuspids, are made in one piece.

More specifically describing the lower denture A, the reference characters 1 designate the anterior molars, 2 the posterior molars, 3 the posterior bicuspid and 4 the anterior bicuspid. The crown of each molar and bicuspid is shown as consisting of a surface 5 in a single plane disposed above the general plane of the crown of the tooth and on the lingual portion thereof. When the teeth are arranged in the denture, the portions 5 of the occlusal surfaces of all of the teeth are disposed in a common plane approximately parallel to the plane of the dental arch, and the teeth are located so that the said portions 5 of the teeth at each side of the denture are disposed on the lingual sides of the crest or apex of the gum or ridge the position of which is generally indicated by the dot and dash lines C. The other portions of the crowns of the teeth are shaped at 6 to more or less simulate in appearance natural or anatomic teeth, but the portions 6 of the crowns are offset below the planes of the surfaces 5, so as to be non-functional in chewing operations, the portions 6 thereby being in effect psuedo-occlusal surfaces.

Now referring to the upper denture B, the reference character 7 designates the anterior molar, 8 the posterior molar and 9 and 10 the posterior and anterior bicuspids, respectively. The crown of each molar and bicuspid has a surface 11 on the lingual portion of the tooth in a single plane and above the general plane of the crown of the tooth. The other portions of the crowns of the teeth are psuedo-occlusal and cut away or recessed at 12 to prevent contact with the psuedo occlusal surfaces 6 of the corresponding or complemental surfaces of lower teeth as shown in Figures 1 and 5. The teeth are set in the denture so that the surfaces 11 are disposed in a common plane approximately parallel to the plane of the dental arch; and the teeth at each side of the denture have the surfaces 11 disposed on the lingual sides of the crest or apex of the gum or ridge. With this construction, and arrangement of the teeth when the dentures are in use, all chewing operations are accomplished between the surfaces 5 and 11 of the lower and upper teeth, and all forces imposed upon the teeth incidental to functional or occlusal contact, i. e. mastication and closing of the jaws, are applied to the dentures simultaneously on the lingual sides of the crests of the gums or ridges at both sides of the dentures. Therefore, the upper and lower teeth have a free grinding movement due to cooperation of the surfaces 5 and 11 of the upper and lower teeth so as to prevent such interlocking of the teeth as would cause slipping or tilting of the dentures on the gums; and furthermore, the forces incident to occlusion and mastication are disposed lingually of the crests of the gums or ridges so that all tendency to tilting of the dentures is obviated.

To provide bilateral balance of the dentures, and to facilitate relative location of the dentures when they are off the articulator one or more of the upper teeth at each side of the denture may have a balancing cusp or projection. As shown on the drawing, only the anterior molars 7 are shown as provided with cusps which are designated 13. These cusps are on the lingual sides of the occlusal surfaces 11, and each has a surface 14 inclined toward the occlusal surface. During functioning of the dentures, the inclined surfaces 14 of the balancing cusp contact with the lingual sides of the corresponding lower teeth as shown in Figures 1 and 6 so as to maintain simultaneous contact at both sides of the dentures. In other words, while the occlusal surfaces 5 and 11 of the upper and lower teeth on one side of the dentures are functioning during chewing, the lingual cusp of the tooth on the other side contacts with the lingual side of the corresponding lower tooth, while when chewing is performed on the opposite side of the dentures, the lingual cusp on the first-mentioned side contacts with the lower tooth. Therefore, all possibility of tilting of the dentures as the result of unbalanced forces thereon is obviated. When the dentures are off the articulator the cusps or projections 13 serve to properly relatively locate and fix the dentures together to facilitate inspection during "trying in" of the dentures, or when held together in the hand before setting or after removal of the dentures in or from the mouth, respectively.

The balancing cusps 13 may be integral with the teeth as shown in Figures 1 to 6 inclusive, and may be initially formed with excessively steep inclination of the inclined surfaces 14, so that the cusps may be ground or reduced to meet varying conditions in different patients. However, the balancing cusps may also be made separate from the main body of the tooth as shown in Figures 7 and 8. Here, the tooth includes a main section 7' having the occlusal surface as hereinbefore described, and a cusp section 16 which has an inclined or beveled end 17 and another undercut end 18 to be embedded in a plate. The cusp 16 may be tilted or adjusted relatively to the main section 14 as shown in Figure 8 to accommodate different conditions and then may be fixedly embedded in the plate in proper relation to the main section as shown in Figure 7.

It will be observed that the bilateral balance may be obtained by providing the balancing cusp upon only one tooth on each side of the denture to ensure adequate bilateral balance, so that other teeth, possibly in simulation of natural teeth, can be most artistically and naturally arranged without affecting the balance in the dentures. Therefore, accurate bilateral balance can be easily and quickly obtained with my invention with minimum detrimental effect upon the appearance of the denture, and the balancing cusps provide for a wide range of adjustment of the balance without affecting the function of the occlusal surfaces of the teeth or the location thereof.

As will have appeared from the foregoing, it is desirable that when the dentures are in centric or retruded rest position as shown in Figure 1, the lingual edges of the occlusal surfaces of the lower teeth are coincident with the junction points of the occlusal surfaces and the inclined surfaces 14 of the lingual cusps on the upper teeth, so that any relative lateral motion of the dentures will ensure proper balancing contact of the lingual cusps with the corresponding lower teeth.

It should be understood that the specific forms of the teeth illustrated are shown primarily to explain the principles of the invention and that the shape and arrangement of the teeth may be changed without departing from the scope of the invention.

Having thus described my invention, what I claim is:

1. In dentures, upper and lower sets of molar teeth the complemental upper and lower teeth of which at each side of the dentures have non-contacting pseudo-occlusal surfaces at the buccal sides of the crests of the ridges and occlusal surfaces formed to contact in occlusal position wholly upon the lingual sides of the crests or apices of the ridges simultaneously at both sides of the dentures.

2. The dentures set forth in claim 1 wherein at least one upper tooth at each side of the upper denture has a lingual projection to contact with the lingual side of the corresponding lower tooth while said dentures are in occlusal positions to provide bilateral balance of the dentures during chewing operations and to properly relatively locate and fix the upper and lower dentures together for inspection during "try in" operations or when held in hand.

3. An upper molar tooth including a main section having a flat occlusal surface, and a separate cusp section at the lingual edge of said occlusal surface having a surface inclined toward said occlusal surface, said cusp section being adjustable relative to the main section to vary the angle of inclination of said inclined surface.

4. A molar tooth for dentures the crown of which includes a pseudo-occlusal portion located to lie in a denture at the buccal side of the tooth and the crests of the ridges, and an occlusal portion above said pseudo-occlusal portion and located to lie in a denture wholly lingually of the crests of the ridges.

5. A molar tooth for dentures the crown of which includes a pseudo-occlusal portion located to lie in a denture at the buccal side of the tooth and the crests of the ridges, and an occlusal portion above said pseudo-occlusal portion and located to lie in a denture wholly lingually of the crests of the ridges, and a projection at the lingual side of the occlusal portion having a surface inclined toward the occlusal surface.

6. A denture comprising upper and lower bases each having gum receiving recesses, lower molars connected to said lower base, upper molars connected to said upper base, at least one of said lower molars having a buccal surface comprising two parts, one of said parts being a vertical upper wall spaced lingually of the lower portion, and an occlusal surface contiguous to the upper edge of said vertical wall, said occlusal surface lying wholly on the lingual side of a line passing through the apex of the gum receiving recesses of the dentures.

7. In a denture, a lower anterior molar and a lower posterior bicuspid the crowns of which comprise substantially vertical walls connecting an occlusal surface and a pseudo-occlusal surface positioned in a plane below that in which lies the occlusal surface, said occlusal surface lying lingually of a line connecting the crests of the aveolar ridges.

8. In dentures, upper and lower sets of posterior teeth, the lowers of which have non-contacting pseudo-occlusal surfaces lying buccally of the crests of the ridges and in planes below those of their occlusal surfaces, and both upper and lower posteriors having occlusal surfaces formed to contact wholly upon the lingual side of the crests of the ridges simultaneously on both sides of the dentures.

VICTOR H. SEARS.